United States Patent [19]

Marx

[11] 4,257,279

[45] Mar. 24, 1981

[54] ROTAMETER WITH FLOAT GUIDE MEMBERS

[75] Inventor: Joachim Marx, Mulheim-Ruhr, Fed. Rep. of Germany

[73] Assignee: Hivolin GmbH, Fed. Rep. of Germany

[21] Appl. No.: 48,858

[22] Filed: Jun. 15, 1979

[51] Int. Cl.³ .............................................. G01F 1/22
[52] U.S. Cl. .................................................. 73/861.57
[58] Field of Search .............................. 73/209, 861.57

[56] References Cited

U.S. PATENT DOCUMENTS

| 2,437,247 | 3/1948 | Fischer | 73/209 X |
| 2,441,350 | 5/1948 | Fischer | 73/209 |
| 2,490,792 | 12/1949 | Fischer | 73/209 |
| 8,842,671 | 10/1974 | Frizell | 73/209 |

Primary Examiner—Herbert Goldstein
Attorney, Agent, or Firm—Sprung, Felfe, Horn, Lynch & Kramer

[57] ABSTRACT

A flowmeter for fluids comprising a transparent vertical tube widening in upward direction, a ball freely disposed within said tube so as to be carried upward in dependence upon the flow, and a plurality of helical guide members on the inside of said tube, the guide members having inner edges which extend substantially vertically so that the free cross-sectional area for movement of the ball is substantially the same at all heights of the tube, the guide members minimizing pendulating of the ball and thereby increasing the accuracy of measurement.

9 Claims, 6 Drawing Figures

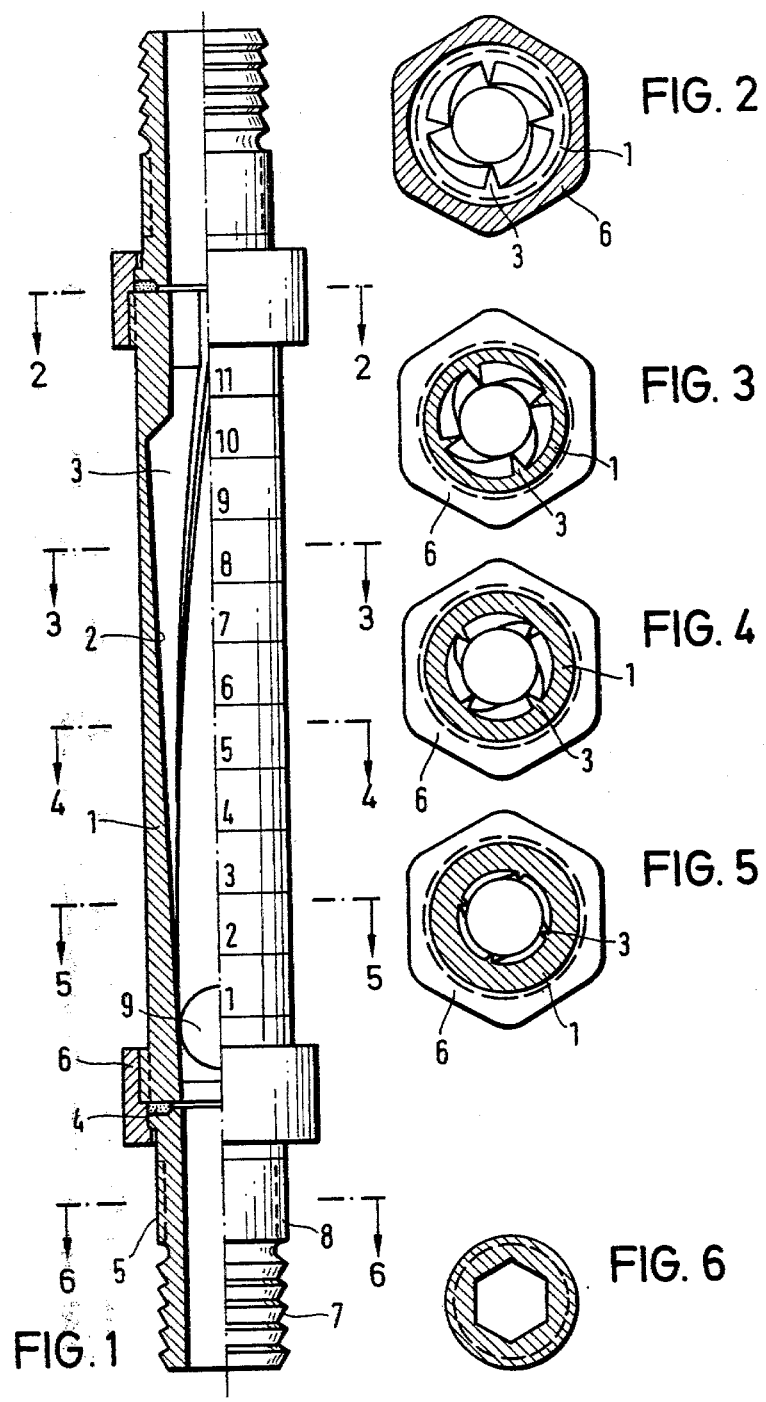

ROTAMETER WITH FLOAT GUIDE MEMBERS

The invention relates to a flowmeter for gas and liquid streams, consisting of a vertical, transparent tube widening in upward direction in the indicating range with at least one float ball disposed therein.

The object of the invention is to provide a flowmeter of the type which has the greatest possible range of measurement.

This object is achieved according to the invention in that the angle of enlargement of the inner space of the tube is between about 1 and 2° 30′ or more, guide members extending on the inside of the tube in longitudinal direction of the tube, whose inner edges run vertically.

While the relatively substantial enlargement of the inner space of the tube in upward direction allows a wide range of measurement, the guide members on the inside of the tube prevent the ball from pendulating back and forth in the upper range and thus giving inaccurate measurements.

Preferably, the guide members are arranged so as to run helically on the inside of the tube, the guide bars completing a helical arc of about 90° over the entire length of the tube. With increasing flow, eddies form behind the ascending ball which can affect the accuracy of measurement. This eddy formation is largely suppressed through the helical arrangement of the guide bars.

Preferably, the tube is made of plastic material so as to make possible a simple construction of the guide bars on the inner side of the tube and of threads at both ends of the tube for connection purposes.

The invention will now be explained more fully with reference to the accompanying drawing wherein:

FIG. 1 is a front elevation with the left half shown in section; and

FIGS. 2 to 6 are sections respectively taken on lines 2—2, 3—3, 4—4, 5—5 and 6—6 of FIG. 1.

Referring now more particularly to FIG. 1, the flowmeter consists of a tube 1, which is transparent, and has a reading scale in an indicating range between its two ends. In the area of this reading scale, the inner space of the tube 1 widens in upward direction so that the inner wall 2 of tube 1 runs at an angle of about 2° to the vertical. Guide members 3 are further provided on the inside of tube 1, which extend in longitudinal direction of tube 1 and whose inner edges run essentially vertically. The guide bars 3 have preferably the form of an acute triangle in cross section so as to give the smallest possible surface of contact with a float element 9 disposed inside tube 1 for indicating the flow. The diameter of tube 1 as limited by the guide members 3 thus remains equal over the entire length of the tube 1. At least three, and preferably four, guide members 3 are arranged inside tube 1.

The guide members 3 can run vertically, which is sufficient where the flow to be measured is very slow so that practically laminar flows result. Preferably, however, the guide bars are arranged helically on the inside of tube 1, and preferably with turns about an angle of 90° over the entire length of tube 1. This facilitates manufacture of the tube 1 of plastic material, by injection molding or the like.

At both its ends, the tube 1 is connected, across a gasket 4, with a hose/screw socket 5 using a sleeve nut 6, which is screwed into each end of tube 1 and holds the hose/screw socket 5. The hose/screw socket 5 has a section 7 for mounting and holding a hose and a threaded section 8 for fastening a hose or a pipe by way of a screw joint.

As can be seen in FIGS. 2 to 5, the free cross-sectional area for movement of the ball is substantially the same at all heights of the tube. This is accomplished by having the inner edge of each guide member substantially vertical, i.e. the transverse cross-sectional area of each guide member increases from bottom to top.

It will be appreciated that the instant specification and examples are set forth by way of illustration and not limitation, and that various modifications and changes may be made without departing from the spirit and scope of the present invention.

What is claimed is:

1. A flowmeter for fluids comprising a transparent vertical tube widening in upward direction, a ball freely disposed within said tube so as to be carried upward in dependence upon the flow, and a plurality of helical guide members on the inside of said tube, the guide members having inner edges which extend substantially vertically so that the free cross-sectional area for movement of the ball is substantially the same at all heights of the tube, the guide members minimizing pendulating of the ball and thereby increasing the accuracy of measurement.

2. A flowmeter according to claim 1, wherein each guide member over its length completes a 90° arc.

3. A flowmeter according to claim 1, wherein the tube and guide members are integrally molded of plastic.

4. A flowmeter according to claim 2, wherein the tube and guide members are integrally molded of plastic, the tube widening from botton to top at an angle of about 1 to 2° 30′.

5. A flowmeter according to claim 1, having four guide members.

6. A flowmeter for fluids comprising a transparent vertical tube widening in upward direction at an angle of about 1 to 2° 30′, a ball freely disposed within said tube so as to be carried upward in dependence upon the flow, and four guide members on the inside of said tube, the guide members having inner edges which extend substantially vertically so that the free cross-sectional area for movement of the ball is substantially the same at all heights of the tube, the guide members minimizing pendulating of the ball and thereby increasing the accuracy of measurement.

7. A flowmeter according to claim 6, wherein each guide member over its length completes a 90° arc.

8. A flowmeter according to claim 6, wherein the tube and guide members are integrally molded of plastic.

9. A flowmeter according to claim 7, wherein the tube and guide members are integrally molded of plastic.

* * * * *